US006943816B2

(12) United States Patent
Pierson (10) Patent No.: US 6,943,816 B2
(45) Date of Patent: *Sep. 13, 2005

(54) LASER-INDUCED THERMAL IMAGING WITH MASKING

(75) Inventor: Dallas K. Pierson, Oakdale, MN (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/636,421

(22) Filed: Aug. 6, 2003

(65) Prior Publication Data

US 2004/0027448 A1 Feb. 12, 2004

Related U.S. Application Data

(62) Division of application No. 09/808,309, filed on Mar. 14, 2001, now Pat. No. 6,623,894.

(51) Int. Cl.[7] .................................................. B41J 2/47
(52) U.S. Cl. ....................................... 347/240; 347/251
(58) Field of Search ................................. 347/240, 251, 347/254, 9, 130, 213, 238, 233, 234, 237, 248; 430/5

(56) References Cited

U.S. PATENT DOCUMENTS

| 4,900,130 A | 2/1990 | Haas ........................... 359/198 |
| 5,164,742 A | 11/1992 | Baek et al. .................. 347/234 |
| 5,183,798 A | 2/1993 | Sarraf et al. ................. 503/227 |
| 5,329,297 A | 7/1994 | Sanger et al. ................ 347/251 |
| 5,555,006 A | 9/1996 | Cleveland et al. ............. 347/41 |
| 5,602,572 A | 2/1997 | Rylander .................... 358/3.09 |
| 5,724,086 A | 3/1998 | Mackin et al. ............... 347/237 |
| 5,808,655 A | 9/1998 | Haas et al. .................. 347/234 |
| 5,818,498 A | 10/1998 | Richardson et al. ......... 347/237 |
| 5,831,659 A | 11/1998 | Sanger et al. ................ 347/238 |
| 5,935,758 A | 8/1999 | Patel et al. .................. 430/200 |
| 5,992,962 A | 11/1999 | Yen et al. ....................... 347/9 |
| 6,001,530 A | 12/1999 | Kidnie et al. ............... 430/201 |
| 6,052,140 A | 4/2000 | Yoshida ...................... 347/234 |
| 6,067,405 A | 5/2000 | Serra .......................... 358/1.8 |
| 6,109,454 A | 8/2000 | Stangebye-Hansen ........ 211/40 |
| 6,171,766 B1 | 1/2001 | Patel et al. .................. 430/339 |
| 6,179,407 B1 | 1/2001 | Bockman ..................... 347/40 |
| 6,493,112 B1 | 12/2002 | Arce et al. .................. 358/3.19 |
| 6,597,388 B2 * | 7/2003 | Pierson ....................... 347/240 |
| 6,659,580 B2 * | 12/2003 | Horikoshi ....................... 347/9 |

FOREIGN PATENT DOCUMENTS

| EP | 0 718 105 A1 | 6/1996 |
| EP | 0 738 068 A2 | 10/1996 |
| EP | 0 946 043 A2 | 9/1999 |

OTHER PUBLICATIONS

"High Power Multi–Channel Writing Heads," IS &T's 47th Annual Conferences/ICPS 1994, Creo Products, Inc., Dan Gelbart.

* cited by examiner

Primary Examiner—Hai Pham
(74) Attorney, Agent, or Firm—Shumaker & Sieffert (57) ABSTRACT

The invention is directed to compensating for imaging aberrations that result from repeated passes by an imaging laser array. The aberrations may result from swath lines formed by thermal heating and from the ruling and screen angle of the image. The techniques described herein reduce the undesirable aberrations in thermal laser generated images by breaking up and/or reducing the swath lines. In general, the techniques provide for overlapping swaths and providing masking for one or both passes that print the overlapped region.

37 Claims, 6 Drawing Sheets

LASER-INDUCED THERMAL IMAGING WITH MASKING

This application is a divisional application of U.S. application Ser. No. 09/808,309, filed Mar. 14, 2001 now U.S. Pat. No. 6,623,894.

TECHNICAL FIELD

The invention relates to imaging, and more particularly to laser-induced thermal imaging.

BACKGROUND

An image may be encoded into image data, which may be transmitted, stored, processed, or otherwise manipulated electronically. The image may be decoded and converted to hard copy by sending the image data to a printer. Laser thermal printers, with their high resolution capability, provide a popular mode for producing hard copy images from digital image data. Laser thermal printers may be used with a variety of imaging media or "receptors," including many kinds of film and paper. In a typical laser imager, a receptor is placed very close to a color-coated substrate or "donor" sheet, and a plurality of laser beams are directed at the donor. Each laser may emit an infrared beam, and the colored coating, which may contain a colorant such as an infrared-sensitive dye, heats when exposed to a beam. The resulting thermal energy induced by the lasers triggers the imaging process, causing colorant to transfer from the donor to the receptor.

The lasers are typically arranged in a linear array, with each laser in the array individually modulated by image data. The array may include any number of lasers, although an array of sixteen lasers is typical. Semiconductor or "diode" lasers are commonly used in an array for reasons of cost, convenience and reliability. The lasers may, for example, emit infrared beams with wavelengths of 830 nm. The width of the array, which is a function of the spacing of the lasers, is usually adjustable.

The image data that modulate the lasers represent the shape, size, color and density of the image. Image data are routinely stored electronically, and are provided to the array in the form of a plurality of signals, typically one signal for each laser. Although the lasers in the array strike only a small portion of the donor and receptor at any one time, the array can print large regions by scanning across the donor and receptor. As the array scans the donor and receptor, each laser in the array emits a be in response to an image signal. In most cases, the laser array may make several successive parallel or helical passes to generate the complete image. Each pass of the array prints a strip or "swath" on the receptor. To avoid the appearance of white lines in the receptor, i.e., unprinted spaces between swaths, successive swaths may abut or overlap preceding swaths.

When a beam sufficiently heats the donor, a spot of colorant is transferred from the donor to the receptor. By modulating the duration for which a laser beam strikes an area on the donor, modulating a laser's intensity and/or modulating the size of the beam, spots of colorant of different sizes may be formed, and thereby colors may appear darker or fainter in color. Often a region of the receptor is intended to receive no colorant from the donor, and consequently a laser emits no beam when scanning that region.

The receptor may be scanned multiple times using donors of different colorants, creating a multicolor image by the superposition of multiple monochromatic images. By repeating scans with donors coated with cyan, yellow, magenta and black, for example, a multicolor image may be formed on the receptor. For high fidelity printing systems, additional colors such as green and orange may be provided.

SUMMARY

The invention is directed to compensating for imaging aberrations, sometimes referred to as "artifacts," that result from repeated passes by an imaging laser array. The invention is particularly useful in a thermal imaging system that makes use of a laser array. Ideally, an observer ought to be able to look at a printed image and see no indications that the image had been formed by repeated passes of a laser array. In some cases, however, unintended patterns, such as groups of lines or streaks, appear in the printed image. Such artifacts may be evident in halftone printing, when printing a single color and when overprinting multiple colors.

At least two factors contribute to these artifacts. One factor is the formation of "swath lines," which may manifest at an edge of a laser swath in the form of heavier colorant depositions. Swath lines may result from the deposition of excess colorant along an edge of the swath, causing a heavier line of colorant than intended and causing the swath to have a non-uniform distribution. Swath lines may also result from a deficit of colorant. The outermost lasers in the array have one neighbor laser instead of two neighbor lasers. As a result, the lines on the edge of the scan may receive less thermal energy, causing less transfer of colorant.

Ruling and screen angle can also contribute to the artifacts. In halftone printing, printed images are formed from halftone dots, with the halftone dots varying in size according to the lightness or darkness of the image. The halftone dots are printed by the lasers, but the halftone dots are generally much bigger than the laser beams. Each laser prints in units of "pixels," and usually a matrix of several pixels is required to make up a single halftone dot. Consequently, it may take several lasers in the array to print a single halftone dot. Halftone dots are printed at a defined ruling, i.e., a number of halftone dots per unit of length, and at a defined screen angle, i.e., an angle at which the rows of halftone dots are oriented. In standard four-color printing, each color is printed using approximately the same ruling, but each color is "screened" at a different angle to prevent halftone dots of different colors from printing one on top of the other and obscuring each other. Screening colors at different angles also avoids generation of an objectionable moiré pattern between the color layers.

When the spatial frequency of the swath lines and the spatial frequency of the halftone dots are close to one another but not equal, a moiré pattern may form. In other words, two small superimposed patterns of similar spatial frequency may combine visually to form a larger and more prominent moire pattern. The moiré pattern usually resembles spurious light and/or dark bands in the image, and is generally considered to be an undesirable aberration of the image. The phenomenon may also be described as "beating," because it results from superposition of patterns close to each other in spatial frequency. In a multicolor image, a plurality of screen angles come into play, and beating may occur in one or more colors, resulting in superimposed moiré patterns.

Stochastic printing is an alternative to halftone printing, in which color density is related to the spatial density of pixels printed by lasers. Moiré patterns tend not to form with stochastic printing because stochastic printing does not employ rulings and screen angles. In stochastic printing, however, swath lines may generate undesirable banding artifacts.

The techniques described below reduce the undesirable aberrations in thermal laser generated images by breaking up and/or reducing the swath lines. The techniques can reduce banding, and when employed in halftone printing, diminish the moiré pattern. In general, the techniques provide for overlapping swaths and providing masking for one or both passes that print the overlapped region. The masks superficially resemble randomized patterns of logical values, but for best performance, the masks are not fully randomized. It has been discovered that visually pleasing results for thermal laser imaging may come about from "pooling" of the logical values in the mask.

In one embodiment, the invention presents a method for printing with a laser imaging system having a plurality of lasers. The method comprises printing a first set of M contiguous lines on a thermally sensitive medium in a first direction as a function of a first set of data and printing a second set of N contiguous lines as a function of a second set of data and a mask. The method also comprises printing a third set of N contiguous lines overlapping the second set of N lines without masking, as a function of the second set of data. The overlapping may be performed in a subsequent printing pass by moving the laser array so that the lasers that print the second set of N lines may be different from the lasers that print the overlapping set of N lines.

In another embodiment, the invention presents a mask for a laser thermal printer. The laser thermal printer includes a plurality of lasers, each laser configured to print at least one pixel. The mask comprises a set of logical values, each logical value corresponding to a pixel. A laser prints a pixel as a function of an image datum and the logical value in the mask corresponding to the pixel. When the logical value in the mask corresponding to the pixel is '1,' the image datum is printed normally, but when the logical value in the mask corresponding to the pixel is '0,' the image datum is not printed. The mask may be in the form of a matrix, or the mask may be any other form that allows replication by tiling. The mask defines two directions, and approximately half of the values in the first direction may be logical '1' and approximately half of the values in the second direction may be logical '1' Although logical '1' values and logical '0' values may be approximately equal in the mask, individual rows and columns are not necessarily composed of half logical '1' values and logical '0' values; rather, individual rows and columns generally include between twenty-five to seventy-five percent logical '1' values. In addition, the logical '1' values in the mask may tend to be pooled in one or both directions.

In a further embodiment, the invention presents a method for printing with a laser imaging system. The method comprises printing a first set of contiguous lines on a thermally sensitive medium as a function of a set of data and a mask, and printing a second set of contiguous lines on the medium overlapping the first set of lines as a function of the set of data. The masked set of lines may include three or more overlapped lines.

In another embodiment, the invention presents a method for printing with a laser imaging system. The method comprises printing a first set of contiguous lines on a thermally sensitive medium as a function of a set of data and a first mask and printing a second set of contiguous lines on the medium as a function of the set of data and a second mask. The second set of lines overlaps the first set of lines. Although both sets of lines are masked, the sets of lines can provide full printing of the overlapped lines.

In an additional embodiment, the invention presents a system, including a thermally sensitive color donor, a receptor positioned to receive colorant from the donor, a laser controller and a set of lasers. Each laser is configured to receive a signal from the laser controller and to emit a beam directed at the donor as a function of the signal. The signals transmitted by the laser controller to a subset of at least three contiguous lasers are a function of image data and a mask.

In another embodiment, the invention presents a method, comprising defining a set of logical values, each logical value corresponding to a pixel. The method also includes arranging the logical values in a first dimension corresponding to a first direction and in a second dimension corresponding to a second direction, with approximately half of the values in the first dimension being logical '1' and with approximately half of the values in the second dimension being logical '1.' The method also comprises generating an enabling printing signal when the value corresponding to the pixel is one of a logical '0' or a logical '1,' and generating a disabling printing signal when the value corresponding to the pixel is the other of a logical '0' or a logical '1.' In an added embodiment, the invention presents a computer-readable medium carrying program code that, when executed, carries out this method.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
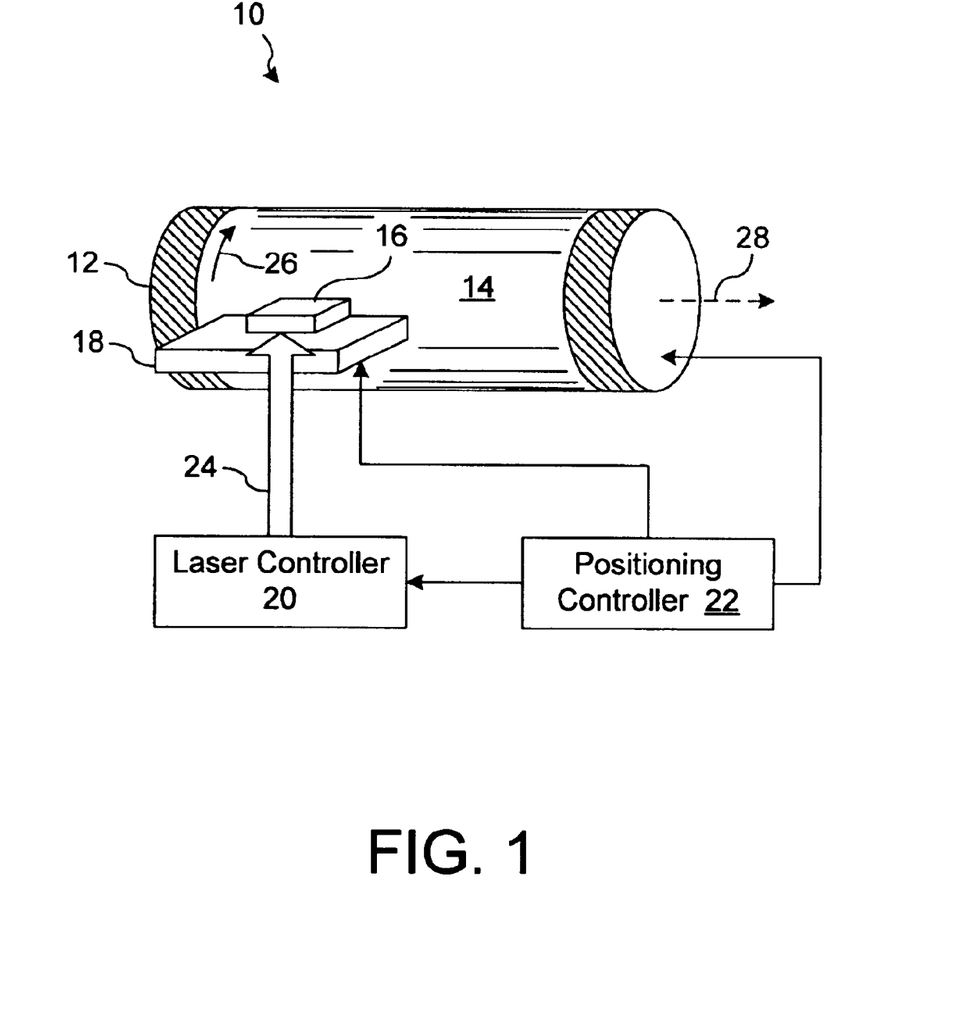
FIG. 1 is a diagram of a laser imaging system.

FIG. 1 shows a typical laser thermal imaging system 10. Mounted to rotating drum 12 is a receptors (not shown in FIG. 1), such as film or paper. Donor 14 is mounted on the drum over the receptor. As drum 12 rotates under the control of positioning controller 22, donor 14 and the receptor rotate together. The direction of rotation 26 of drum 12 is called the "fast scan direction." Writing head 16, which includes an array of lasers, is coupled to optical head platform 18, which positions writing head 16 with respect to drum 12. Optical head platform 18 can move laterally with respect to drum 12. The direction in which optical head platform 18 can move is the same direction 28 as the axis of rotation of drum 12, and is called the "slow scan direction." Writing head 16 may print parallel swaths fast scan direction 26 or slow scan direction 28, but usually writing head 16 prints swaths helically by printing in fast scan direction 26 and slow scan direction 28 simultaneously.

Positioning controller 22 regulates the rotational speed of drum 12 and the position of optical head platform 18. By rotating drum 12 and/or moving optical head platform 18, positioning controller 22 can bring one or more lasers to bear upon substantially any point on the surface of donor 14.

Lasers in writing head 16 are under the control of laser controller 20, and are modulated by image data 24 supplied by laser controller 20. Positioning controller 22 typically sends a timing signal to laser controller 20 so that the correct image data will be supplied to the lasers when the laser array is in the correct position relative to donor 14. Laser controller 20 may be, for example, a computer such as a personal computer, a microcomputer or an embedded processor or microcontroller.

Figure 2:
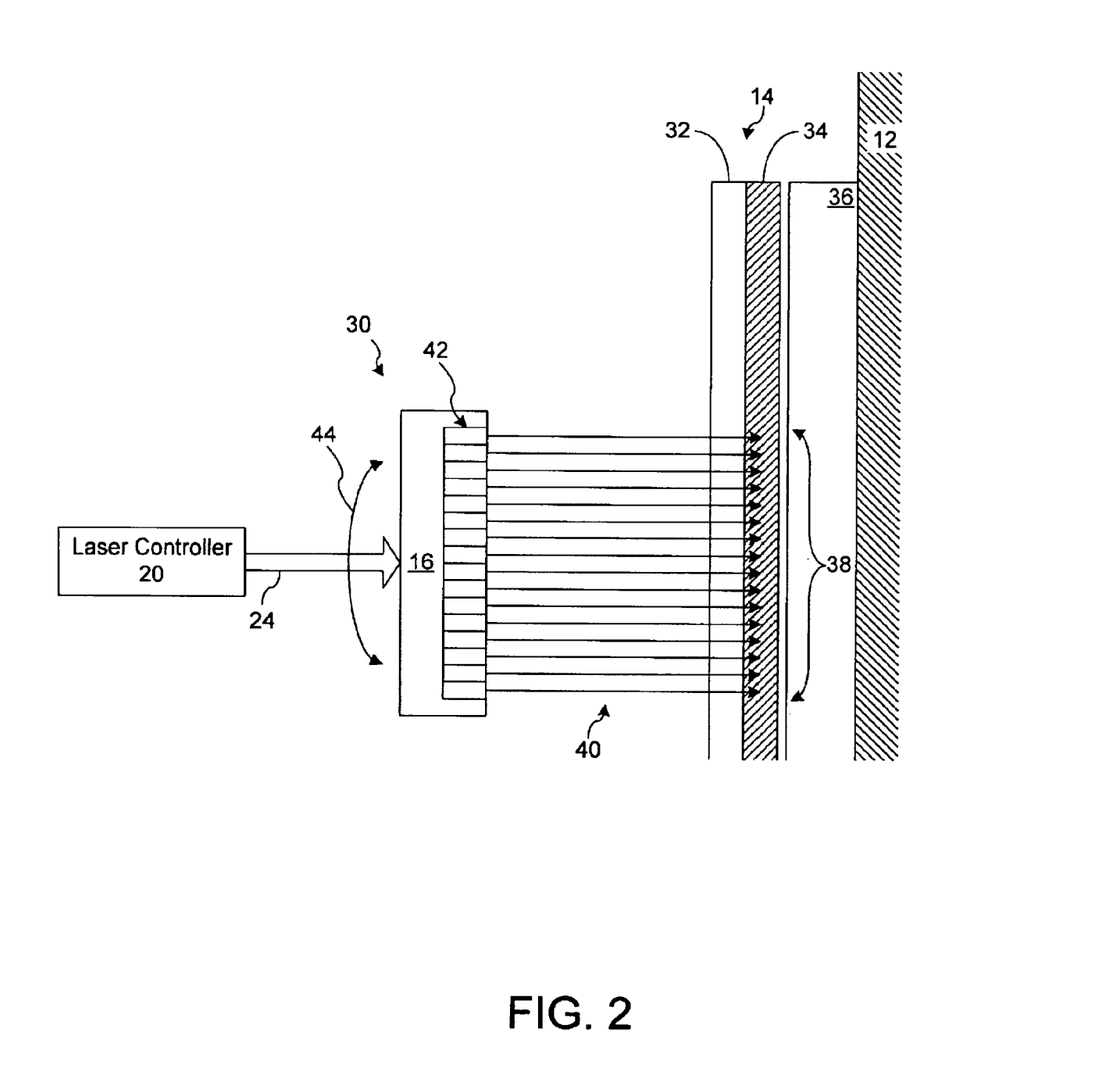
FIG. 2 is a diagram of an array of lasers with a donor and receptor.

FIG. 2 depicts a laser thermal imaging process. Writing head 16 comprises an array 42 of sixteen lasers. Each laser in array 42 is separately controlled by laser controller 20. Although sixteen individual laser beams 40 may be emitted from array 42 as shown in FIG. 2, the invention may be used with thermal imaging arrays having more or fewer individual lasers. Beams 40 strike substrate 32 of donor 14, heating colored coating 34. Substrate 32 and/or colored coating 34 may be selected to absorb the wavelength of radiation emitted by the lasers. Heating causes colorant to transfer from donor 14 onto receptor 36.

The surface of receptor 36 may be, in effect, divided into small picture elements or pixels. A single laser can generate a spot of colorant, called a "laser dot," at one pixel on receptor 36. The path taken by a laser beam as it scans across donor 14 is called a "line," each line including one or more pixels. Each laser may or may not print one or more laser dots along the line that it scans, depending upon the modulating signal received from laser controller 20. The total of the lines printed by laser beams 40 make up swath 38. The width of swath 38 may be varied by rotating array 42 about an axis perpendicular to the surface of drum 12, as indicated by reference numeral 44, allowing printing at different resolutions. As described above, a typical halftone dot is larger than a pixel or a line, so it takes several lasers to print a single halftone dot. Also as described above, swath lines tend to form along an edge of swath 38. The spatial frequency of the swath lines, in conjunction with the spatial frequency of colored regions due to ruling and screen angle, may generate an undesirable moiré pattern.

Figure 3:
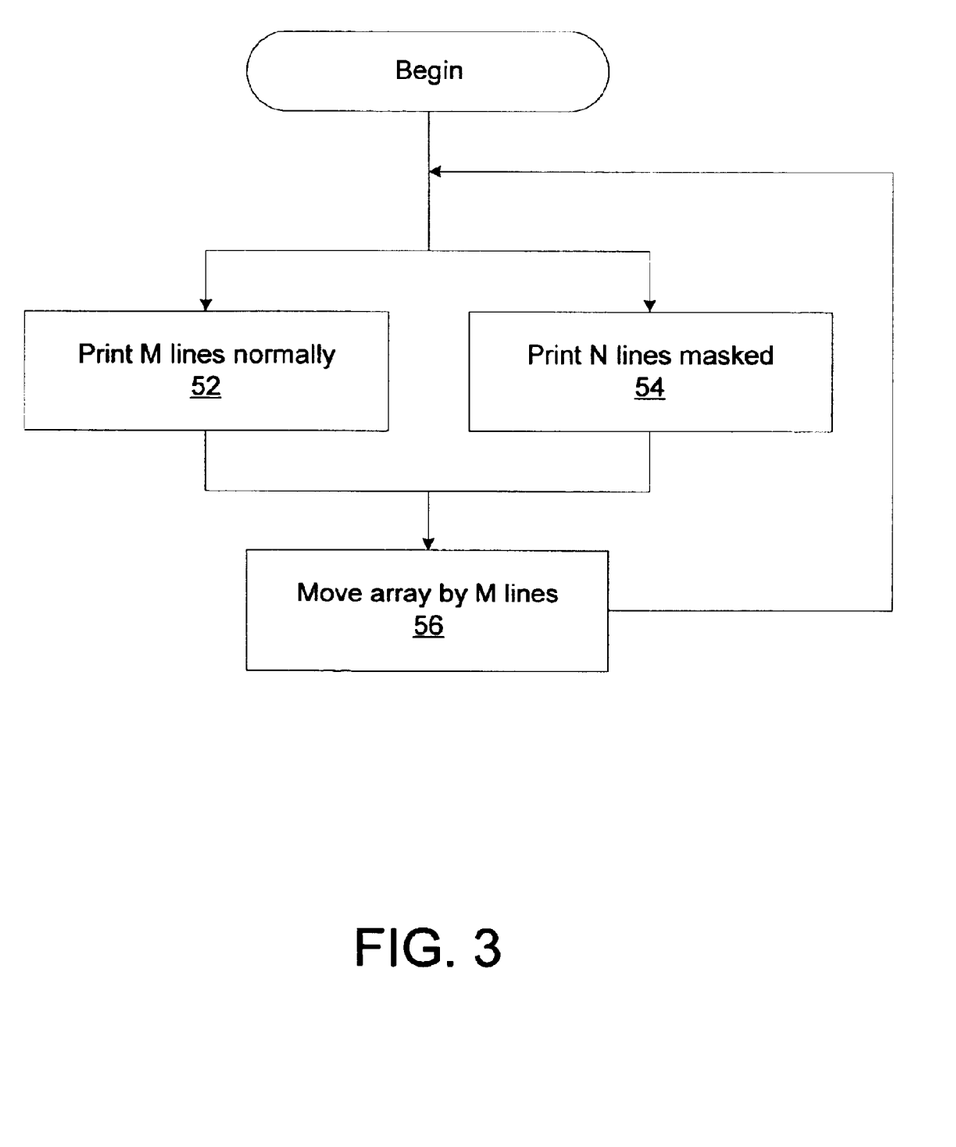
FIG. 3 is a flowchart illustrating an embodiment of the invention.

FIG. 3 is a flowchart showing a technique that illustrates an embodiment of the invention, by which a moiré pattern may be eliminated or substantially reduced. The technique assumes that the lasers in the array are divided into two groups, M and N, with M+N equaling the total number of lasers in the array. The lasers within each group are contiguous, i.e., groups are not overlapped or interlaced. The technique further assumes that M is greater than or equal to N, so that the M lasers may overlap the swath made by N lasers on a preceding swath.

For each swath, M lines are printed normally (52) according to the image data delivered to laser controller 20 for modulation of the lasers. The remaining N lasers in the array, however, do not print normally. Instead, N lines are printed using, in addition to the modulating image data, a logical mask (54), which will be described in more detail below. The M lines and the N lines are printed substantially simultaneously. Because of masking via the logical mask, not all of the image data will be printed by the N lasers, so these lines are only partially printed. Furthermore, because of the masking, swath lines are broken up and are less visually prominent. For the following swath, the array is moved over by M lines (56) and the next swath is printed using the same procedure. M lasers print the data unmasked (52), and some of the M lasers print over lines already partially printed by the N lasers. The M lasers re-print the same data already printed by the N lasers, except that now the data are printed unmasked. As a result, part of each swath gets printed twice: once in a masked form by the N lasers, and then in an unmasked form by the M lasers. In some kinds of laser thermal imaging, printing part of an image twice generally does not result in an excess of colorant or other noticeable aberration of the image. Printing part of each swath with a mask, however, can significantly reduce the appearance of swath lines and thus disrupt the moiré pattern and improve the visual appearance of the resulting image.

For purposes of illustration, consider the sixteen lasers as shown in FIG. 2, and let M=N=8. On the very first swath, the first eight lasers in the array print their data normally, and the second eight lasers print only part of their data, because of masking. Upon completion of the first swath, the array is moved eight lines, and the second swath begins. On the second swath, the first eight lasers rewrite the same lines that were printed, at least in part, by the second eight lasers on the first swath. On the second swath, these data are printed without masking. Some pixels are printed twice, once on the first pass by the second eight lasers and again on the second pass by the first eight lasers. Other pixels are printed for the first time by the first eight lasers. Meanwhile, the second group of eight lasers writes eight new lines of masked data, which will be printed again unmasked by the first eight lasers on the following swath. When M=N, every line in the image, except for the first M lines, is printed twice first in masked format, then in unmasked format. When the printing is completed, the full image has been printed. Every line has been fully printed and no image data have been discarded.

Figure 4:
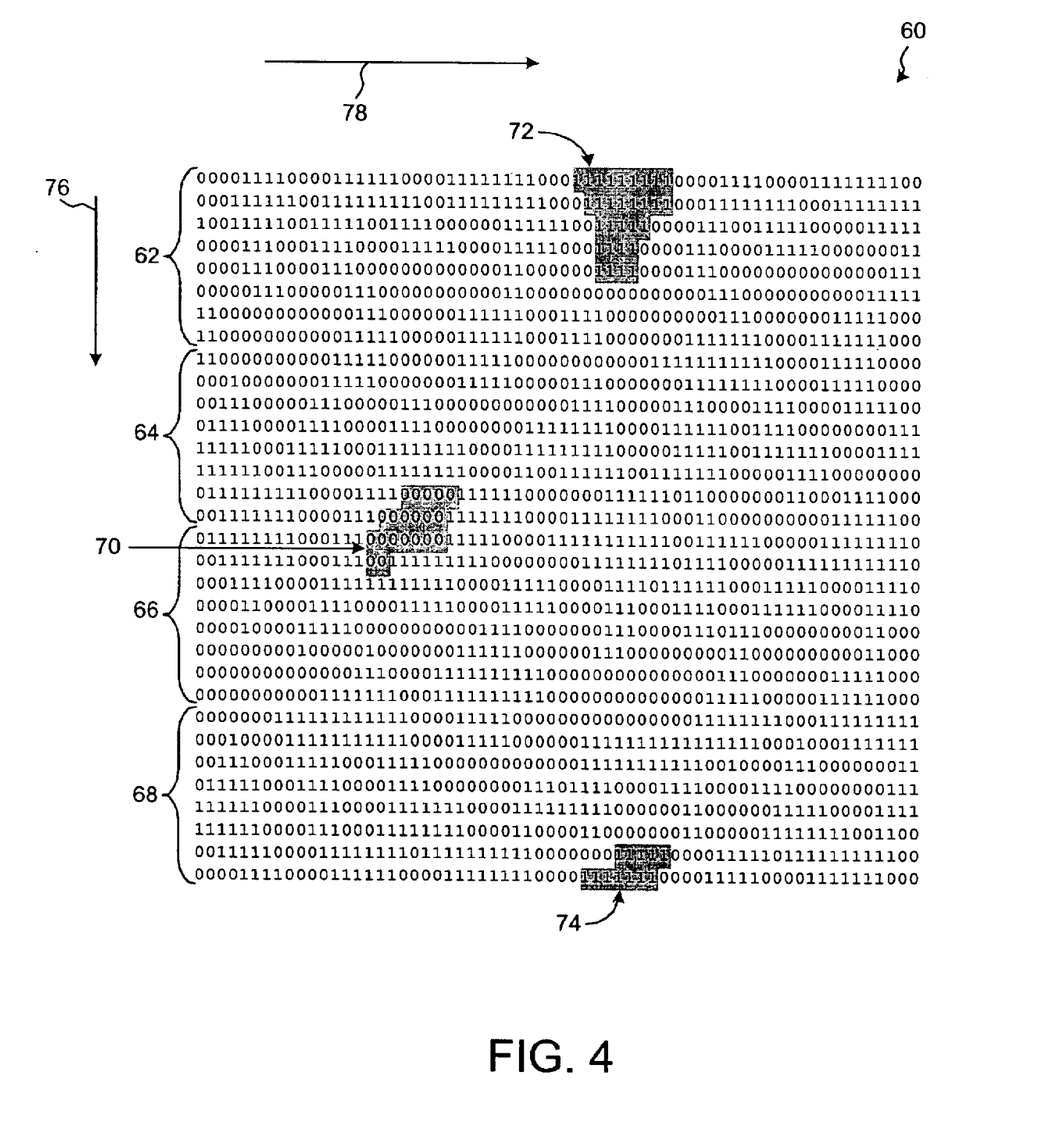
FIG. 4 depicts an exemplary mask in accordance with an embodiment of the invention.

An exemplary mask 60 is shown in FIG. 4. Mask 60 is a set of logical values in the form of a 64-by-32 matrix of logical '0' values and logical '1' values. Each logical value corresponds spatially to a pixel on the receptor. Arrow 78 identifies the fast scan direction and arrow 76 identifies the slow scan direction. Mask 60 may be stored in the memory of laser controller 20 or anywhere in the data handling path. When a laser prints masked data, the laser's image data for a pixel is combined by a logical AND operation with the mask logical value corresponding to the pixel. When the value in the mask corresponding to a pixel is a logical '1,' the laser is enabled and the pixel is printed normally. When the value in the mask corresponding to a pixel is a logical '0,' the laser is disabled and the pixel is not printed.

Although a 64-by-32 area of pixels is fairly small, mask 60 can be replicated by tiling in fast scan direction 78 and slow scan direction 76, and can thereby be expanded to cover a printing surface of arbitrary size. A single mask may support several swaths. When printing sixteen-line swaths with eight lines of overlap, for example, mask 60 may be divided into four subset masks 62, 64, 66 and 68. In a first swath, image data may be masked by mask subset 62, and in a second swath, image data may be masked by mask subset 64. By tiling mask 60 in slow scan direction 76, subset mask 62 may be used after subset mask 68. Using a variety of subset masks breaks up swath lines more effectively than simply using a single smaller mask over and over.

In mask 60, approximately half of the mask values are logical '1' values and approximately half of the mask values are logical '0' values in both fast scan direction 78 and slow scan direction 76. Individual rows and columns are not necessarily composed of equal numbers of logical '1' values and logical '0' values, however. In mask 60, individual rows and columns generally include between twenty-five to seventy-five percent logical '1' values. The arrangement of logical values in mask 60 is not fully random. If the mask logical values were fully random, the result would include clusters or "pools" of logical '0' values and logical '1' values in fast scan direction 78 and slow scan direction 76, but the mask would also be expected to include regions of alternating logical values such as '10101' in both directions. A truly random mask would also be expected to include strings of logical values in the both directions broken up by a single complementary logical value, such as '0001000.'

In mask 60, the mask logical values tend to be pooled, with fewer instances of alternating logical values and fewer instances of isolated single logical values. Moreover, the pools may tend to cross over from mask subset to successive mask subset, as shown by small cluster of logical '0' values 70, which straddles two mask subsets 64 and 66. In addition, because mask 60 may be extended indefinitely by tiling, pooling of mask logical values continues from the bottom of mask 60 to the top. For example, small cluster of logical '1' values 74 in mask subset 68 will be contiguous with cluster 72 in mask subset 62. In effect, small cluster of logical '1' values 72 and 74 straddles mask subsets 68 and 62.

In laser thermal imaging, each laser in the array, when printing, derives some benefit from the heat generated by its neighbor lasers. As a result, printing by several adjacent lasers is more energy efficient than printing by an equal number of isolated lasers. In addition, isolated laser pulses result in lower density pixels, which may result in an undesirable visual appearance. Pooling reduces the locations where a single laser or pair of adjacent lasers are activated, and takes advantage of the thermal energy generated by a group of neighboring lasers. Using a mask with pooled mask logical values generally produces a more visually pleasing result than using a mask with truly random logical values, because pooling tends to result in printing by adjacent lasers more frequently. In addition, composing the mask rows and columns of approximately equal numbers of logical '0' values and logical '1' values tends to avoid creating light and dark lines within the image, thereby generating an image with a more pleasing appearance. The mask rows and columns need not be composed of approximately equal numbers of logical '0' values and logical '1' values, however.

A mask may be generated mathematically or experimentally. Mask 60 was generated experimentally, through testing masks of several sizes, shapes and compositions of logical values. For example, the pooling of logical values was adjusted so that the pools would be large enough to take advantage of the thermal energy generated by a group of neighboring lasers, but small enough to break up swath lines. An experimentally created mask has several advantages. When using an experimentally created mask, for example, computing resources in laser controller 20 need not be devoted to computationally generating a mask during the printing process. Instead, an experimentally created mask is static and is pre-made, enabling retrieval of the mask or any subset of the mask when needed. Furthermore, an experimentally created mask can be thoroughly tested under controlled conditions, and will therefore hold fewer surprises during actual printing.

Figure 5A:
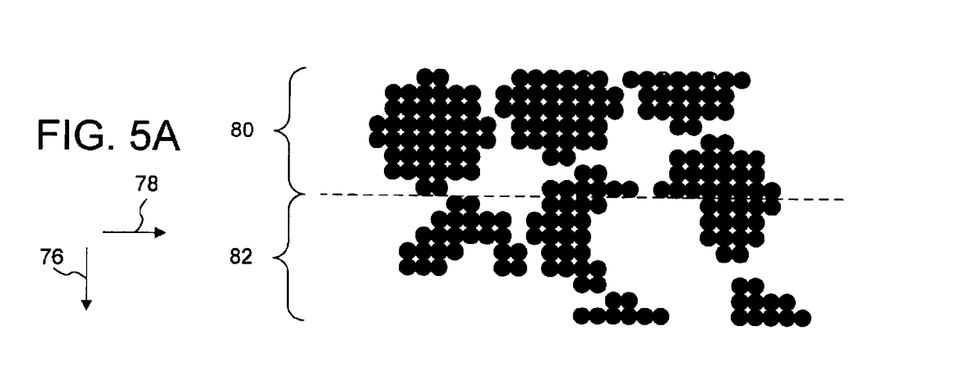
FIGS. 5A, 5B and 5C show an example of printing using masking techniques in accordance with an embodiment of the invention.
Figure 5B:
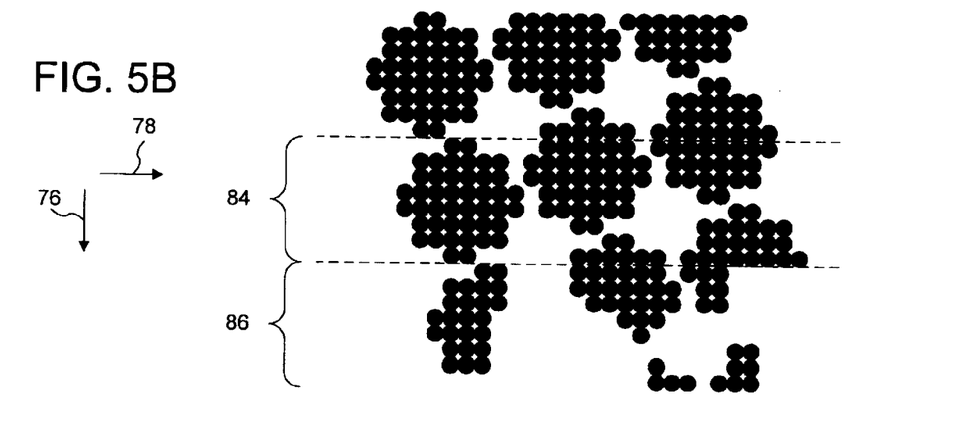
Figure 5C:
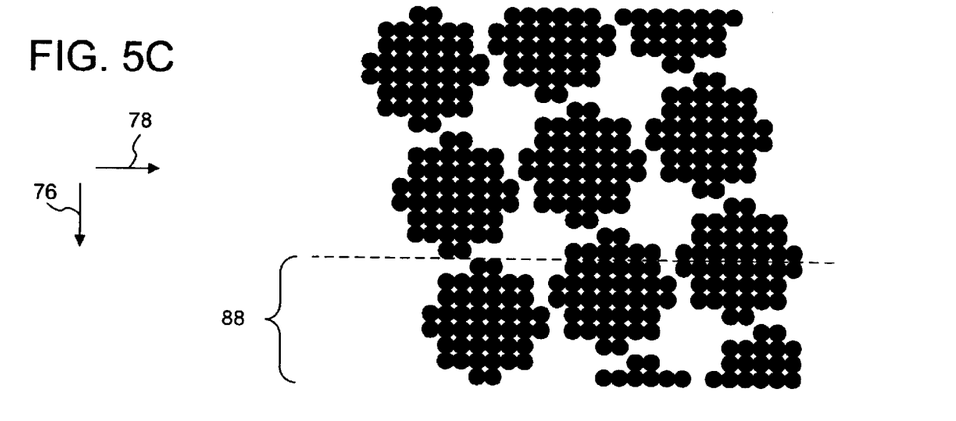

FIGS. 5A, 5B and 5C show an example of the techniques described above. In these figures, it is assumed that there are sixteen lasers in the array and that M=N=8. The final printed image, which is printed in three passes, appears in FIG. 5C. FIG. 5A depicts the results of the first pass. The first group of eight lasers prints lines normally (80), but the second group of eight lasers prints lines masked (82). The second eight lasers print part of the image data and leave part unprinted. The lines are printed in fast scan direction 78.

For the second pass shown in FIG. 5B, the array has been moved eight lines in slow scan direction 76. The first eight lasers print in their entirety the image data that was only partially printed on the first pass (84). As a result, some pixels printed by the first eight lasers are printed twice and others are printed for the first time. The second group of eight lasers writes eight new lines of masked data (86).

As can be seen from FIGS. 5A and 5B, printed pixels of masked data (82, 86) tend to be clumped together. The clumping is a consequence of pooling of mask logical values, like the pooling shown in mask 60 in FIG. 4.

For the third pass, shown in FIG. 5C, the array has been moved another eight lines in slow scan direction 76. The first eight lasers print in their entirety the image data (88) that was only partially printed by the second eight lasers on the second pass (86).

The techniques described above assume that M equals N, but M and N need not be equal. When M and N are equal, the time needed to print an image is nearly doubled because a substantial portion of the image is printed twice. The amount of duplicated printing can be reduced by making N less than M. For example, if M=13 and N=3, the first 13 lines of each swath are printed without masking, and only three lines are printed masked. After each swath, the array is moved by thirteen lines. On the following swath, the data printed by the group of three lasers on the preceding swath are re-printed unmasked. The remaining ten lasers in this group print ten lines of new data unmasked. The group of three also prints three lines of new data, but these data are masked. In this example, three of every thirteen lines are printed twice.

An overlap of one or two lines generally does not adequately break up the swath lines. Three lines of overlap may produce good results, with additional lines of overlap producing marginal improvement. At some point, however, the marginal improvement due to overlapping an additional line becomes negligible. Overlapping eight lines, for example, may generate an image that is just as satisfactory as overlapping seven lines. The amount of overlap may vary from image to image, and may depend upon the features of the image such as density of color, resolution, screen angle, swath size, and halftone dot structure. The amount of overlap may also vary from color to color in a single image.

Figure 6:
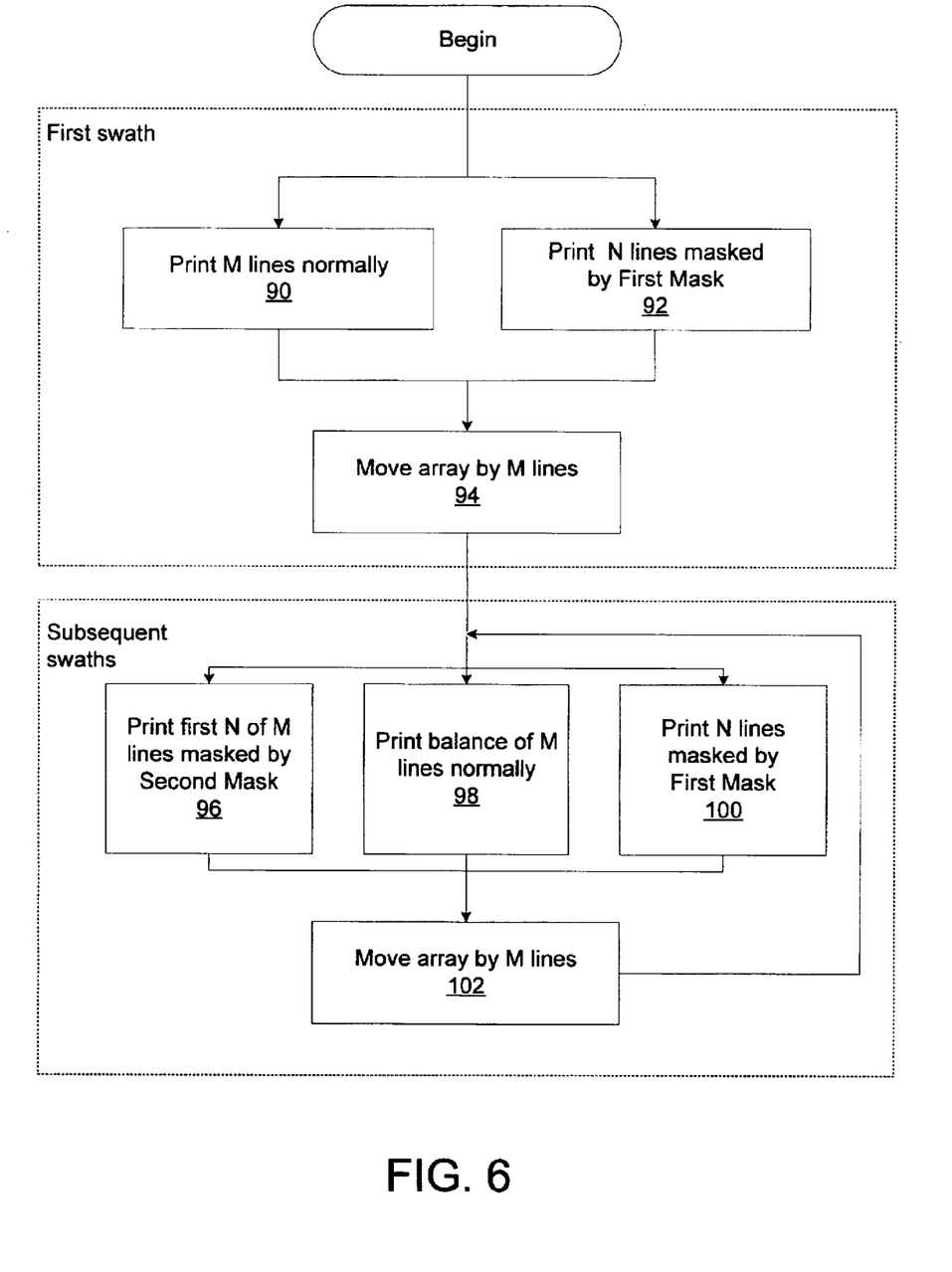
FIG. 6 is a flowchart illustrating another embodiment of the inventions

FIG. 6 is flowchart illustrating another embodiment of the invention, in which two masks are used. For the first swath, M lines are printed normally (90) and the remaining N lines are printed using a first logical mask (92). The array is then moved over by M lines (94) so the next swath may be printed. For the second and subsequent swaths, however, the first N of M lasers print using a second logical mask (96), the balance of the M lasers print normally (98) and the N lasers print using the first mask (10). The array is then moved over by M lines (102) and the process is repeated.

It is generally desirable to print every pixel in a line that ought to be printed in the first or the second pass or in both passes, so that no image data is lost in the masking process. The masking techniques described herein provide full printing of the image. In other words, the techniques do not regulate whether a pixel will be printed or not, but rather the techniques regulate when a pixel will be printed, i.e., in which pass a pixel will be printed. To print each line fully and avoid image data loss, the following logical equation should hold.

$$D = (D \ \& \ M1) | (D \ \& \ M2)$$

In this equation, D represents an image datum corresponding to a particular pixel in the image, and M1 and M2 are the mask logical values corresponding to a particular pixel. To avoid any loss of image data, either M1=logical '1' or M2=logical '1' or both for all image data.

Returning to the example above in which M=N=8, the first mask may be mask 60 shown in FIG. 4. The second mask may be the logical complement of mask 60, i.e., a mask of dimensions equal to mask 60, with every logical '0' value replaced by a logical '1' value and vice versa. Logically complementary masks may be desirable, for example, when using a kind of laser thermal imaging in which printing part of an image twice may result in an excess of colorant deposition. When using a kind of laser thermal imaging in which printing part of an image twice does not result in an excess of colorant deposition, it may be desirable to have masks that are not true logical complements. For example, the second mask may include more logical '1' values than the logical complement of the first mask, with the edges of pools of logical '0' values in the second mask replaced with logical '1' values. Alternatively, the edges of pools of logical '0' values in the second mask may be replaced with logical '1' values in either the fast scan direction or the slow scan direction. Note that when M=N, lines may be printed with first logical mask (92) and printed a second time with a second logical mask (96) without a balance of lines printed normally (98).

The technique illustrated in FIGS. 3, 5A, 5B and 5C is a specific case of the more general techniques shown in FIG. 6. Printing M lines normally (52) is equivalent to printing M lines masked by a second mask (96), with all logical values in the second mask being logical '1' values. Furthermore, two masks may be used with any number of overlapping lines. In an example described above in which M=13 and N=3, the three overlapping lines may be printed in a first swath using a first mask (92). On a second swath, the three lines may be printed again with a second mask (96) and ten lines may be printed normally (98). The same result may be obtained on the second swath by printing all M lines using a second mask, with the second mask including ten contiguous lines of logical '1' values.

A number of embodiments of the present invention have been described. Nevertheless, various modifications may be made without departing from the scope of the invention. M is preferably greater than or equal to N, but this is not required for the invention. Nor is it necessary for M and N to be constant. A laser thermal printer having eight lasers in an array, for example, may print each swath twice. In the first pass, all print lines are masked and in the second pass, all print lines are unmasked. The laser thermal imaging system described above is exemplary, and the techniques for reducing swath lines may be employed with other laser thermal imaging systems, such as systems that print on a flat plane instead of a drum. Moreover, mask 60 shown in FIG. 4 is not the only mask that may produce good results, and the invention is not limited to the particular mask shown. A mask need not have approximately equal numbers of logical '0' values and logical '1' values in rows, columns or in the mask as a whole, but may use different proportions of logical values. A mask need not have the same dimensions as mask 60 shown in FIG. 4, although a larger mask tends to break up swath line patterns more pleasingly than a smaller mask. The mask need not be in the form of a rectangular matrix, but be a set of logical values in any shape that can tile a plane, such as a triangle, hexagon or rhombus. In addition, different masks may be created for different colors. Mask 60 may work well with cyan, for example, but a different mask may be used for magenta, which is printed at a different screen angle. These and other embodiments are within the scope of the following claims.

What is claimed is:

1. A method for printing with a laser imaging system having a plurality of lasers, the method comprising:
   printing a first set of M contiguous lines on a thermally sensitive medium in a first direction as a function of a first set of data;
   printing a second set of N contiguous lines on the thermally sensitive medium in the first direction as a function of a second set of data and a mask; and
   printing a third set of N contiguous lines on the thermally sensitive medium overlapping the second set of N lines as a function of the second set of data,
   wherein printing the second set and printing the third set comprises printing at least a portion of the second set of data twice.

2. The method of claim 1, wherein printing a first set of M lines and printing a second set of lines is performed in a first printing pass, and printing a third set of N lines is performed in a second printing pass.

3. The method of claim 1, wherein the number of lasers is equal to M plus N.

4. The method of claim 1, wherein N is less than or equal to M.

5. The method of claim 1, wherein N is an integer greater than two.

6. The method of claim 1, wherein the first direction is the fast scan direction of the laser imaging system.

7. The method of claim 6, further comprising:
   mounting the thermally sensitive medium on a rotatable drum; and
   rotating the drum in the first direction.

8. The method of claim 1, further comprising moving the lasers in a second direction to a position in which the lasers printing the second set of N contiguous lines are different from the lasers printing the third set of N contiguous lines.

9. The method of claim 1, wherein a line comprises pixels and wherein the mask comprises a set of logical values corresponding to the pixels, the method further comprising printing a pixel when the value in the mask corresponding to the pixel is logical '1.'

10. The method of claim 1, wherein the mask is a first mask, the method further comprising:
   printing the third set of N contiguous lines on the thermally sensitive medium over the second set of N lines as a function of the second set of data and a second mask,
   wherein printing the second set of N contiguous lines and printing the third set of N contiguous lines provide full printing of the N lines.

11. The method of claim 10, wherein the second mask is logical complement of the first mask.

12. A method for printing with a laser imaging system having a plurality of lasers, the method comprising:
   printing a first set of contiguous lines on a thermally sensitive medium as a function of a set of data and a mask; and
   printing a second set of contiguous lines on the thermally sensitive medium overlapping the first set of lines as a function of the set of data,
   wherein printing the first set and printing the second set comprises printing at least a portion of the set of data twice.

13. The method of claim 12, wherein the first set of lines includes at least three lines.

14. The method of claim 12, wherein printing the first set of lines is performed in a first printing pass, and printing the second set of lines is performed in a second printing pass.

15. The method of claim 14 further comprising printing a third set of contiguous lines on the thermally sensitive medium in the first printing pass.

16. The method of claim 12 wherein the first and second sets of lines are printed in a first direction, the method further comprising moving the lasers in a second direction to a position in which the lasers printing the first set of lines are different from the lasers printing the second set of lines.

17. The method of claim 16, wherein the first direction is the fast scan direction and the second direction is the slow scan direction.

18. A method for printing with a laser imaging system having a plurality of lasers, the method comprising:
   printing a first set of contiguous lines on a thermally sensitive medium as a function of a set of data and a first mask;
   printing a second set of contiguous lines on the thermally sensitive medium as a function of the set of data and a second mask; and
   wherein the second set of lines overlap the first set of lines and wherein printing the first set and printing the second set comprises printing at least a portion of the second set of data twice.

19. The method of claim 18, wherein printing the first set of lines and printing the second set of lines provide full printing of the overlapped lines.

20. The method of claim 18, wherein the second set of lines is larger than the first set of lines.

21. The method of claim 18,
   wherein the first set of lines comprises pixels,
   wherein the first mask comprises a set of logical values, each logical value corresponding to a pixel, and
   wherein a pixel is printed when the value in the first mask corresponding to the pixel is logical '1.'

22. The method of claim 21, wherein the second data mask at least the logical complement of the first data mask, the second data mask having a logical '1' value for each logical '0'value in the first data mask.

23. The method of claim 22, wherein the number of logical '1'values in the second mask is larger than the number of logical '0'values in the first mask.

24. A system comprising:
   a thermally sensitive color donor including colorant;
   a receptor positioned to receive colorant from the donor;
   a controller; and
   a set of lasers, each of the lasers receiving a signal from the controller and emitting a beam directed at the donor as a function of the signal,
   wherein the signals from the controller to a subset of lasers are a function of image data and a mask, the subset comprising at least three contiguous lasers.

25. The system of claim 24,
   wherein the subset of lasers is a first subset,
   wherein each beam defines a line,
   wherein the set of lasers is mounted in a writing head,
   wherein the writing head is movable in a first direction,
   lines formed by the first subset of lasers are overwritten by a second subset of lasers, the signals from the controller to the second subset of lasers being a function of the image data.

26. The system of claim 25, wherein the mask is a first mask, wherein the signals from the controller to the second subset of lasers are a function of the image data and a second mask.

27. The system of claim 24 wherein the lasers are semiconductor lasers.

28. The system of claim 24 further comprising a mounting surface configured to receive the donor and the receptor.

29. The system of claim 28 wherein the mounting surface is a rotatable drum.

30. The system of claim 24, wherein the controller includes memory, the memory configured to store the mask.

31. The system of claim 30, the memory configured to store the image data.

32. A method comprising:
   defining a set of logical values, each of the logical values corresponding to a pixel;
   arranging the logical values in a first dimension corresponding to a first direction and in a second dimension corresponding to a second direction, wherein approximately half of the values in the first dimension are logical '1' and wherein approximately half of the values in the second dimension are logical '1';
   arranging at least one subset of the logical '1' values in a pool;
   generating an enabling printing signal when the value corresponding to the pixel is one of a logical '0' or a logical '1'; and
   generating a disabling printing signal when the value corresponding to the pixel is the other of a logical '0' or a logical '1.'

33. The method of claim 32 wherein arranging the logical values in the first dimension corresponding to the first direction comprises arranging the logical values in individual rows in the first dimension, wherein arranging the logical values in the second dimension corresponding to the second direction comprises arranging the logical values in individual columns in the second dimension, and wherein the individual rows and columns comprise between twenty-five to seventy-five percent logical '1' values.

34. The method of claim 32 further comprising replicating the set of logical values by tiling to correspond to an arbitrarily large set of pixels.

35. A computer-readable medium carrying program code that, when executed:
   defines a set of logical values, each of the logical values corresponding to a pixel;
   arranges the logical values in a first dimension corresponding to a first direction and in a second dimension corresponding to a second direction, wherein approximately half of the values in the first dimension are logical '1' and wherein approximately half of the values in the second dimension are logical '1';
   arranges at least one subset of the logical '1' values in a pool;
   generates an enabling printing signal when the value corresponding to the pixel is one of a logical '0' or a logical '1'; and
   generates a disabling printing signal when the value corresponding to the pixel is the other of a logical '0' or a logical '1.'

36. The medium of claim 35, wherein the program code that arranges the logical values in the first dimension corresponding to the first direction arranges the logical values in individual rows in the first dimension, wherein the program code that arranges the logical values in the second dimension corresponding to the second direction arranges the logical values in individual columns in the second dimension, and wherein the individual rows and columns comprise between twenty-five to seventy-five percent logical '1' values.

37. The medium of claim 35, the medium further carrying program code that, when executed, replicates the set of logical values by tiling to correspond to an arbitrarily large set of pixels.

* * * * *

UNITED STATES PATENT AND TRADEMARK OFFICE
CERTIFICATE OF CORRECTION

PATENT NO. : 6,943,816 B2
DATED : September 13, 2005
INVENTOR(S) : Dallas K. Pierson It is certified that error appears in the above-identified patent and that said Letters Patent is hereby corrected as shown below:

<u>Column 10,</u>
Line 17, after "second set of" insert -- N --.

Signed and Sealed this

Eighth Day of November, 2005

JON W. DUDAS
*Director of the United States Patent and Trademark Office*